(12) United States Patent
Reichard

(10) Patent No.: US 8,704,661 B1
(45) Date of Patent: Apr. 22, 2014

(54) PERSONAL SITUATIONAL AWARENESS SYSTEM

(76) Inventor: Ronald Anthony Reichard, Greeley, CO (US)

( * ) Notice: Subject to any disclaimer, the term of this patent is extended or adjusted under 35 U.S.C. 154(b) by 333 days.

(21) Appl. No.: 13/023,367

(22) Filed: Feb. 8, 2011

Related U.S. Application Data

(60) Provisional application No. 61/302,433, filed on Feb. 8, 2010.

(51) Int. Cl.
*G08B 21/00* (2006.01)
*G02C 7/14* (2006.01)

(52) U.S. Cl.
CPC .................................. *G02C 7/14* (2013.01)
USPC ............................................. 340/540; 351/50

(58) Field of Classification Search
CPC ........................................................ G02C 7/14
USPC .......... 340/540; 351/44, 45, 50; 359/630, 631
See application file for complete search history.

(56) References Cited

U.S. PATENT DOCUMENTS

| | | | |
|---|---|---|---|
| 614,673 A | 11/1898 | Taylor | |
| 1,074,145 A | 9/1913 | Walts | |
| 2,371,196 A | 3/1945 | Swan | |
| 4,064,434 A | 12/1977 | Waksberg | |
| 4,154,504 A | 5/1979 | Mohs | |
| 4,298,913 A | 11/1981 | Lozar | |
| 4,792,223 A * | 12/1988 | Axelbaum | 351/158 |
| 4,798,454 A | 1/1989 | Hyun | |
| 4,912,778 A | 4/1990 | Daniels | |
| 4,934,806 A | 6/1990 | Berke et al. | |
| 5,503,637 A * | 4/1996 | Kyricos et al. | 607/88 |
| 5,588,154 A * | 12/1996 | Blauer et al. | 2/69 |
| 5,764,335 A | 6/1998 | Berke | |
| 5,790,230 A | 8/1998 | Sved | |
| 6,007,198 A | 12/1999 | Burton | |
| 6,012,812 A | 1/2000 | Rickards | |
| 6,076,924 A * | 6/2000 | Wysocki | 351/50 |
| 6,196,678 B1 | 3/2001 | Chapin, III | |
| 6,728,974 B2 | 5/2004 | Wadsworth | |
| 6,801,363 B1 * | 10/2004 | Bettinger | 359/631 |
| 2005/0062930 A1 * | 3/2005 | Lin | 351/50 |
| 2008/0130272 A1 * | 6/2008 | Waters | 362/106 |

OTHER PUBLICATIONS

Priority Application, U.S. Appl. No. 61/302,433, filed Feb. 8, 2010.

* cited by examiner

*Primary Examiner* — John A Tweel, Jr.
(74) *Attorney, Agent, or Firm* — Santangelo Law Offices

(57) ABSTRACT

Methods and apparatus may allow for personal situational awareness. An optical relay may be mounted to a mounting component joined to an article worn on an individual's person, such as glasses, headgear, clothing, and the like. Optical information may be relayed from an individual's blind spot to an individual's line of sight. Relayed optical information may be transformed, including by isolating relevant optical information and eliminating extraneous optical information.

23 Claims, 16 Drawing Sheets

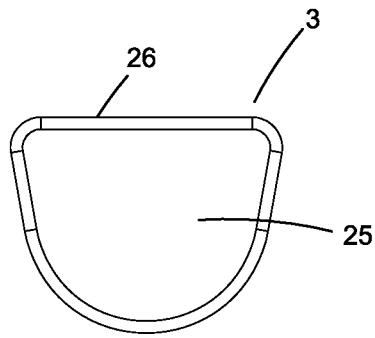
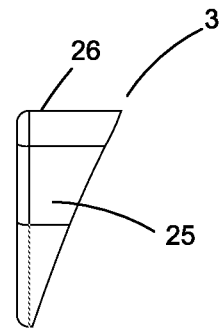
Fig.30 Fig.31
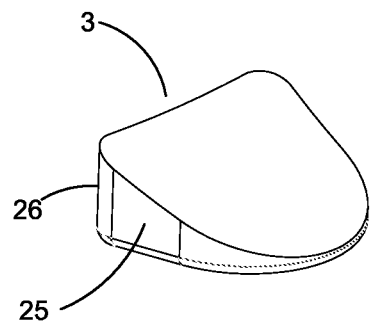
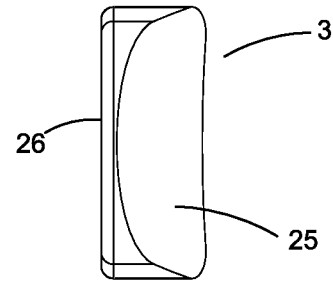
Fig.32 Fig.33

PERSONAL SITUATIONAL AWARENESS SYSTEM

This application claims priority to and the benefit of U.S. Provisional Application No. 61/302,433, filed Feb. 8, 2010, said patent application and any priority case hereby incorporated herein by reference in their entirety.

BACKGROUND

Generally, the inventive technology relates to expanding an individual's field of vision beyond the natural periphery to promote safety awareness. Specifically, the inventive technology involves methods and apparatus for optically relaying transformed optical information from beyond an individual's peripheral vision to the individual's line of sight. The inventive technology may be particularly suited to increasing personal safety in environments having moving vehicles equipped with warning lights.

Heavy equipment in motion can present many hazards in the environments in which they operate. For example, forklifts in warehouses, construction equipment on job sites, and other kinds of moving heavy equipment can pose collision risks to individuals also working in those environments. Naturally, collisions of these types can cause serious injury or even death. For this reason, these kinds of heavy equipment often are provided with visual warning systems designed to alert individuals to the locations and movements of such heavy equipment. Examples of such visual warning systems may include flashing lights of various colors, strobes, and other visual indicators designed to be seen and heeded by individuals, thus allowing these persons to navigate around such heavy equipment.

Conventional visual warnings of the type discussed above may suffer drawbacks, however. For example, such visual warnings naturally will only be effective if they fall within an individual's line of sight. Naturally, if the heavy equipment is moving outside of an individual's field of vision, such as perhaps from behind, the individual may not have the opportunity to heed the visual warning and avoid the heavy equipment. This problem can be exacerbated when the individual's other senses are impaired. For example, working environments in which heavy equipment is utilized often may be very loud, due to noise factors such as moving machinery or operating engines, requiring individuals working in such environments perhaps to use hearing protection. Naturally, such hearing protection may block audible indications of the movements and locations of moving heavy equipment, making any failure to see and heed visual warnings even more dangerous.

While conventional technologies may have been developed to address these problems, they may themselves suffer various drawbacks. For example, mirrors potentially can provide one way to increase an individual's field of view. However, by reflecting all elements of the mirrored background within the relatively small area of the minor, distracting elements can be included in the field of view, and any visual warnings may be represented in small size and perhaps may tend to blend in with the background. Additionally, since mirrors simply reflect the background, the light intensity of the visual warning may not be amplified or otherwise increased. Moreover, mirrors may simply depict the background substantially as it exists, and may fail to isolate the visual warning from the background clutter. For example, mirrors may enable image transfer of the entire visual background, whereas what may be desired is simply information transfer of the visual warning. In this respect, mirrors may fail in several ways, such as by failing to emphasize the visual warning, failing to eliminate non-relevant visual information, failing to transform the visual warning into relevant information such as a transformed blinking or other off/on visual representation, or the like. Examples of conventional technologies using mirrors include U.S. Pat. No. 5,674,335, issued Oct. 7, 1997, U.S. Pat. No. 2,371,196, issued Mar. 13, 1945, and U.S. Pat. No. 1,074,145, issued Sep. 30, 1913. However, because these conventional technologies may rely on mirrors, they may have the problems discussed above and may be considered as teaching away from the inventive technology described herein.

The foregoing problems related to conventional technologies may represent a long-felt need for an effective solution to the same. While implementing elements may have been available, actual attempts to meet this need may have been lacking to some degree. This may have been due to a failure of those having ordinary skill in the art to fully appreciate or understand the nature of the problems and challenges involved. As a result of this lack of understanding, attempts to meet these long-felt needs may have failed to effectively solve one or more of the problems or challenges here identified. These attempts may even have led away from the technical directions taken by the present inventive technology and may even result in the achievements of the present inventive technology being considered to some degree an unexpected result of the approach taken by some in the field.

SUMMARY OF THE INVENTION

The inventive technology relates to personal situational awareness systems and may include one or more of the following features: techniques for optically relaying optical information from an individual's blind spot to an individual's line of sight; techniques for transforming such relayed optical information; techniques for isolating relevant optical information in relayed optical information; techniques for eliminating extraneous optical information in relayed optical information; and various related techniques as described herein. Accordingly, the objects of the personal situation awareness system described herein address each of the foregoing problems in a practical manner. Naturally, further objects of the inventive technology will become apparent from the description and drawings below.

BRIEF DESCRIPTION OF THE DRAWINGS

FIGS. 24-25 and 30-33 are perspective views of a second configuration of a mounting platform in one exemplary embodiment.

DETAILED DESCRIPTION OF THE PREFERRED EMBODIMENTS

Figure 1:
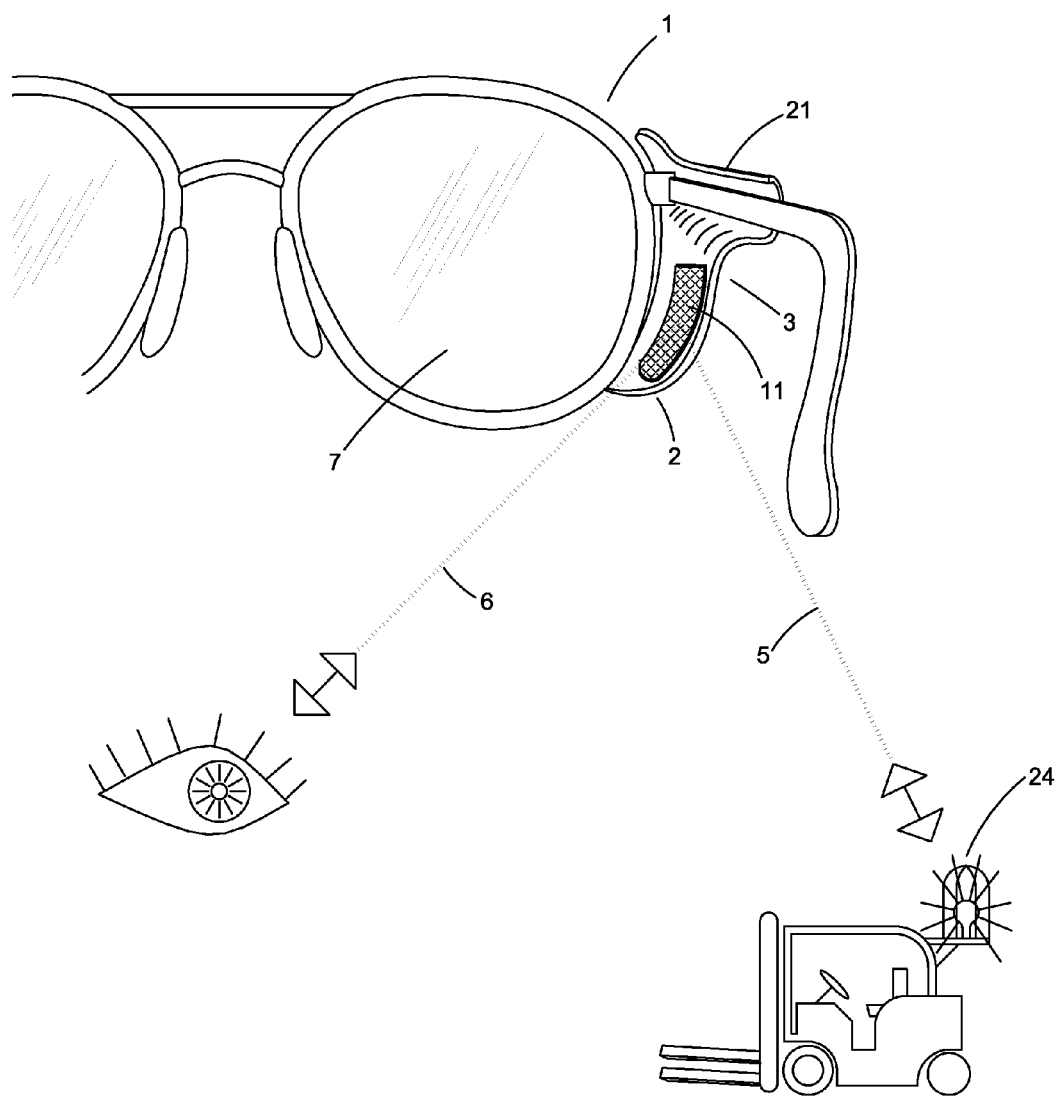
FIG. 1 is a conceptual view of the operation of a strip reflector in one exemplary embodiment.
Figure 2:
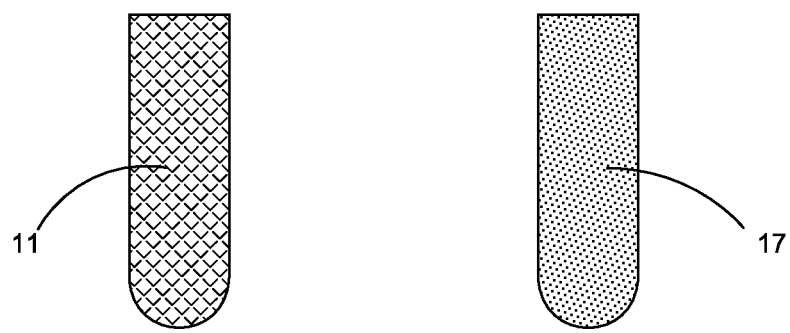
FIG. 2 is a plan view of a strip reflector and an adhesive mounting component in one exemplary embodiment.
Figure 3:
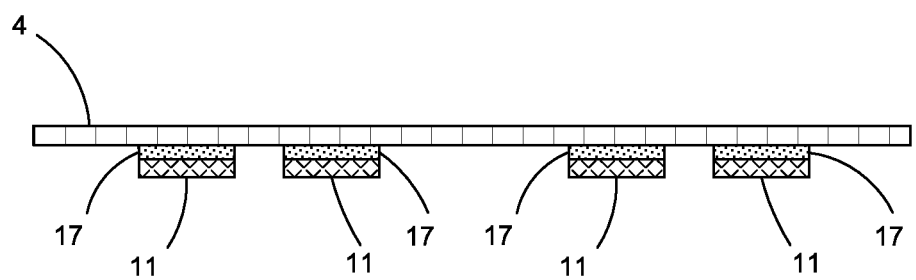
FIG. 3 is a side elevation view of a packaging component for a strip reflector and an adhesive mounting component in one exemplary embodiment.
Figure 4:
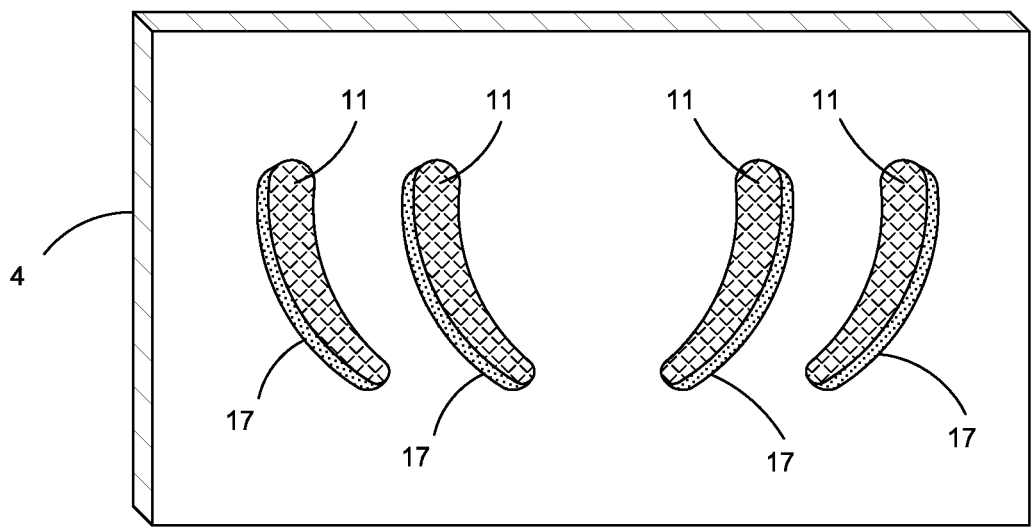
FIG. 4 is a plan view of a packaging component for a strip reflector and an adhesive mounting component in one exemplary embodiment.
Figure 5:
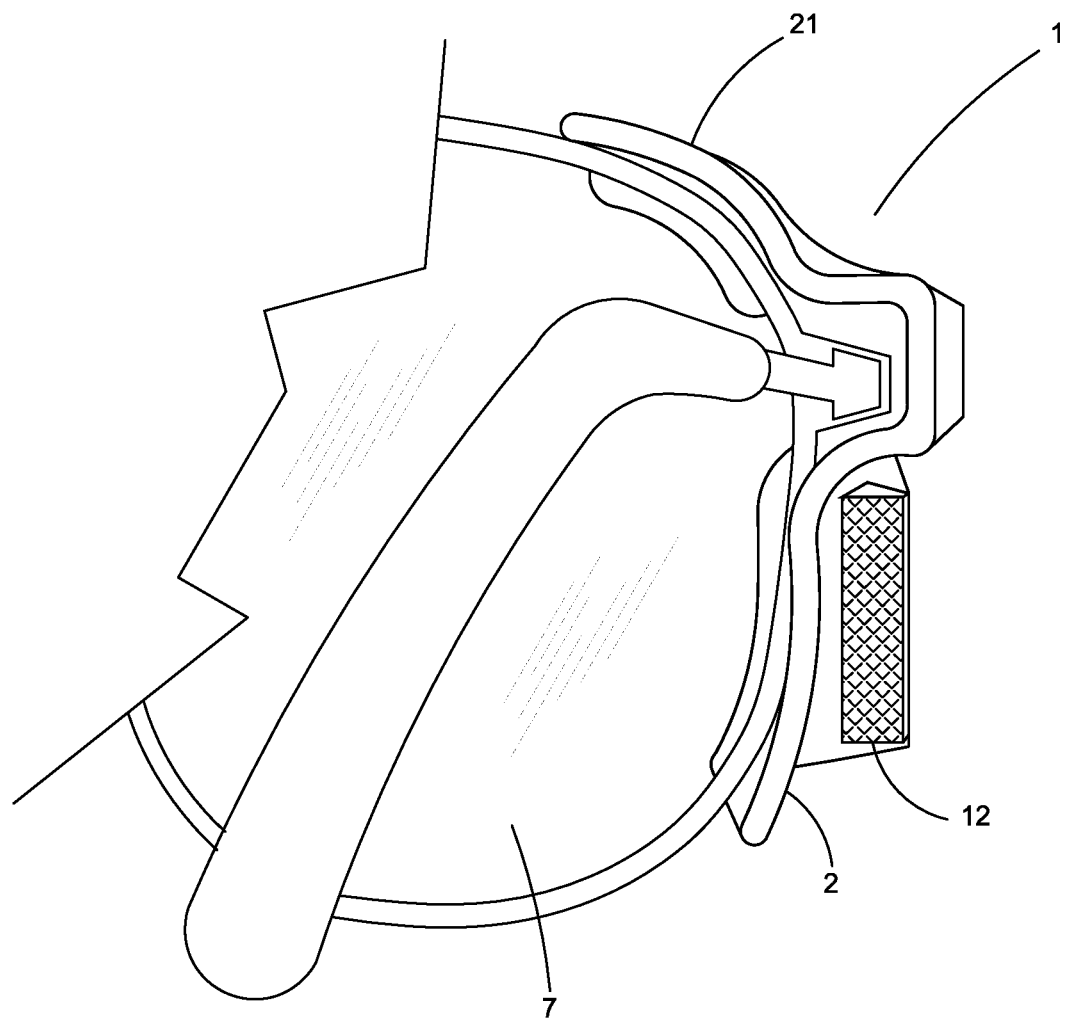
FIG. 5 is a rear elevation view of a worn article and a prism reflector in one exemplary embodiment.
Figure 6:
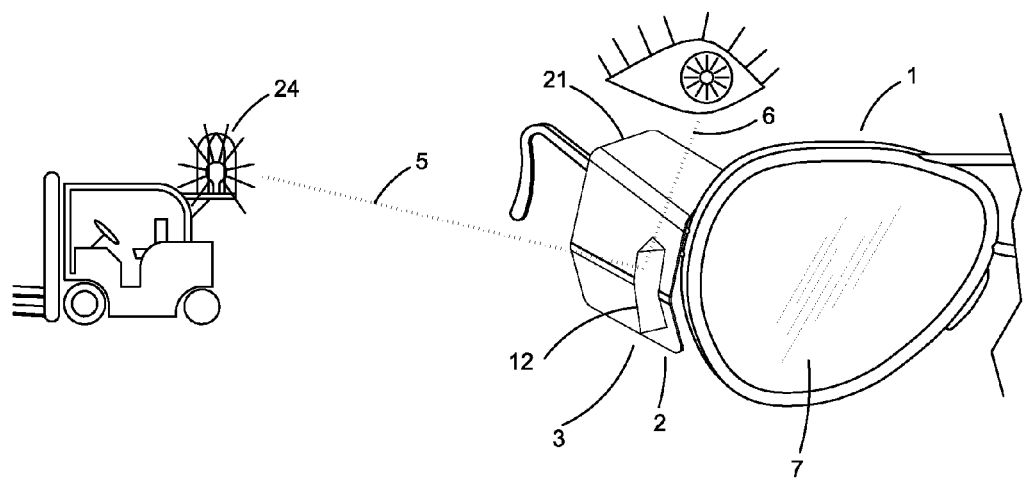
FIG. 6 is a conceptual view of the operation of a prism reflector in one exemplary embodiment.
Figure 7:
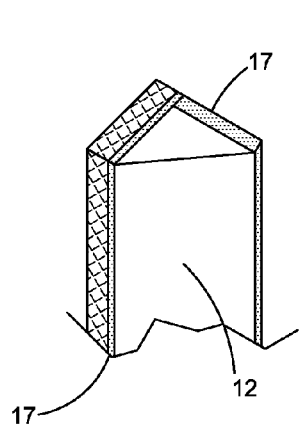
FIG. 7 is a perspective view of a section of prism reflector in one exemplary embodiment.
Figure 8:
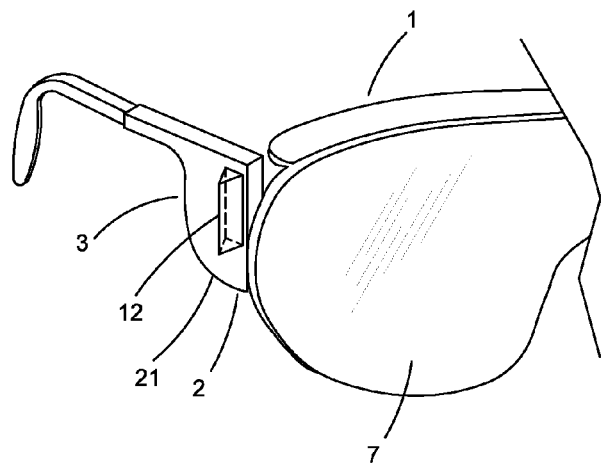
FIG. 8 is a perspective view of a prism reflector mounted on to a mounting component joined to a worn article in one exemplary embodiment.

As mentioned earlier, the present inventive technology includes a variety of aspects, which may be combined in different ways. The following descriptions are provided to list elements and describe some of the embodiments of the present inventive technology. These elements are listed with initial embodiments, however it should be understood that they may be combined in any manner and in any number to create additional embodiments. The variously described examples and preferred embodiments should not be construed to limit the present inventive technology to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Various embodiments may utilize a personal situational awareness system. Such a system may facilitate situational awareness of a person, for example perhaps by expanding an individual's field of vision beyond the natural periphery, perhaps allowing increased perception and awareness of areas outside of the individual's natural line of sight. Examples of the conceptual operation of a personal situational awareness system may be seen in exemplary embodiments in FIGS. 1, 6, 9, and 12. The personal situation awareness system in various embodiments may give an individual the ability to sense, and perhaps may alert an individual, of a near or imminent danger of possible physical or bodily harm from behind.

The personal situational awareness system in various embodiments may utilize an article (1) configured to be worn on an individual's person. Such articles (1) may include, for example, glasses (7) of various types (such as prescription glasses, sunglasses, safety glasses, and the like), headgear (8) of various types (such as hard hats, baseball caps, visors, and the like), clothing of various types (such as basic apparel, work belts, safety vests, and the like), and any other suitable articles capable of being worn on an individual's person. FIGS. 1, 5-6, 8-9, 12, 19, and 21 may show examples of different kinds of worn articles. It may be appreciated that utilizing the personal situational awareness system on an article worn by an individual may make the system compact and highly personal to the individual.

A mounting component (2) may be configured for joinder to the article (1), and an optical relay (3) may be mounted to the mounting component (2).

As seen in exemplary embodiments in FIGS. 1, 5-6, 8-9, 12-20, and 22-33 the mounting component (2) may be any suitable support, backing, setting, or the like, on or in which the optical relay (3) may be mounted. As but one example, presented only to illustrate the manners and modalities which a mounting component (2) may take, a pair of safety glasses (7) may be described here as an example of an article (1), and the manners and modalities of joining various kinds of mounting components (2) thereto may be described. Joinder may be via a cast mold for said safety glasses (7) (such as wherein the mold by which a pair of safety glasses (7) may be cast includes a structure for creating a mount in or on said safety glasses (7)), a surface treatment on said safety glasses (7) (such as wherein the optical relay (3) may be a treated surface of the safety glasses (7) themselves), a surface coating on said safety glasses (7) (such as wherein the optical relay (3) may be a coating applied to the safety glasses (7)), an embedded emplacement within said safety glasses (7) (such as wherein the optical relay (3) may be fixed within a surrounding mass of the safety glasses (7)), a molded surface of said safety glasses (7) (such as wherein a surface of the safety glasses (7) may be shaped complimentarily to receive the optical relay (3)), an adhesive adhered to said safety glasses (7) (such as wherein the optical relay (3) may be adhered to the safety glasses (7) via glue, sticky tape, or the like), a magnet attached to said safety glasses (7) (such as wherein the optical relay (3) may be attached to the safety glasses (7) with a magnet), a mechanical fastener affixed to said safety glasses (7) (such as wherein the fastener operates using mechanical principles, including, but not limited to, clips, hooks, crimps, tongs, or the like), a separate piece joined to said safety glasses (7) (such as wherein the mounting component (2) is a piece separate from the safety glasses (7), which may be separably removed and attached to the safety glasses (7)), an integrated structure of said safety glasses (7) (such as wherein the mounting component (2) is unitary with the safety glasses (7), as in the case of structure contiguous and inseparable from the safety glasses (7)), a side shield of said safety glasses (7) (such as wherein the mounting component (2) may hold the optical relay (3) on or at the safety glasses' (7) side shield), a protruding surface of said safety glasses (7) (such as wherein the mounting component (2) may protrude from a surface of the safety glasses (7)), a wing established on said safety glasses (7) (such as wherein the mounting component (2) may be a wing extending from the safety glasses (7)), or a mounting platform (25) joined to the safety glasses (7) (such as wherein the platform may be a raised surface relative to the glasses frame having an optical relay mounting surface (26)).

Figure 12:
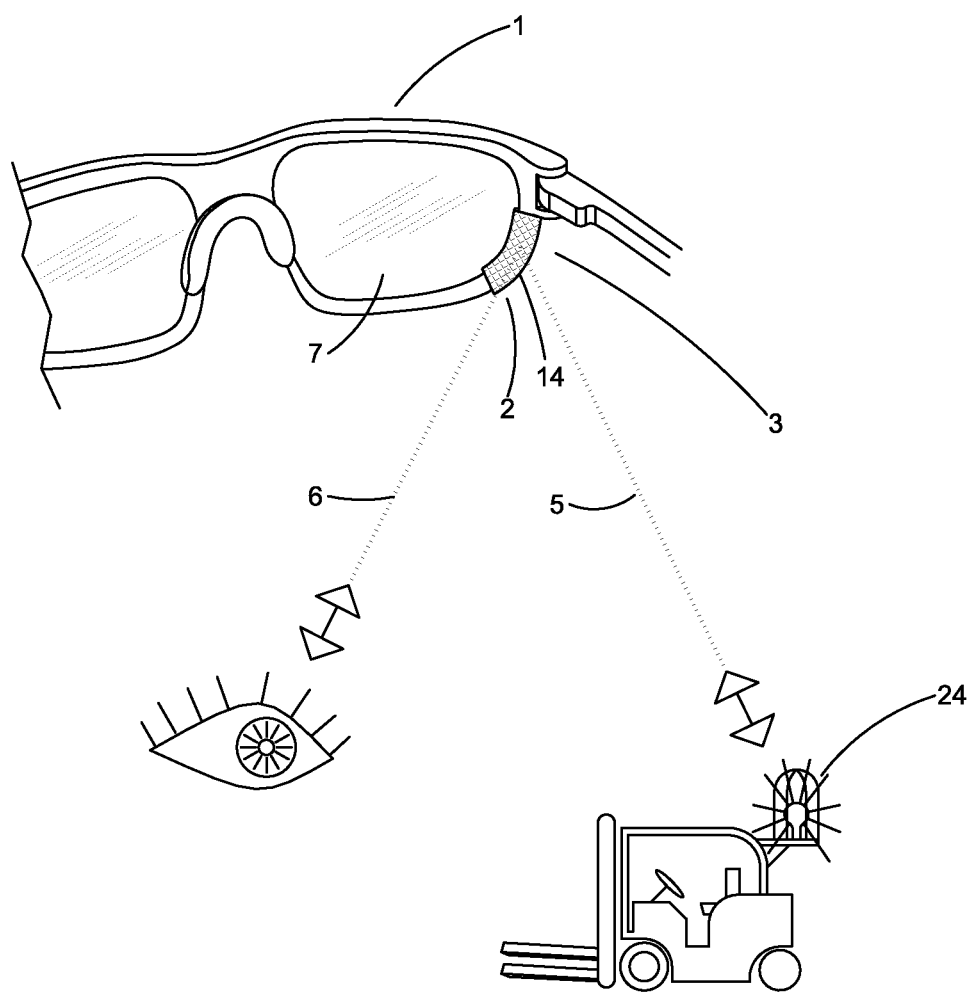
FIG. 12 is a conceptual view of the operation of a reflector mounted to a surface coating in one exemplary embodiment.
Figure 13:
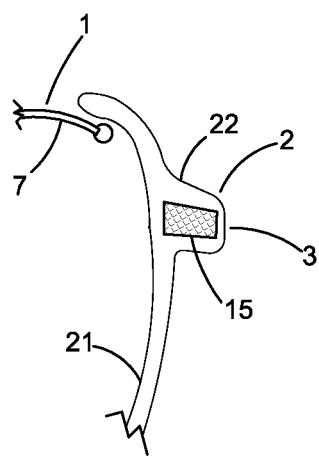
FIG. 13 is a plan view of a reflector mounted in an embedded emplacement within a worn article in one exemplary embodiment.
Figure 14:
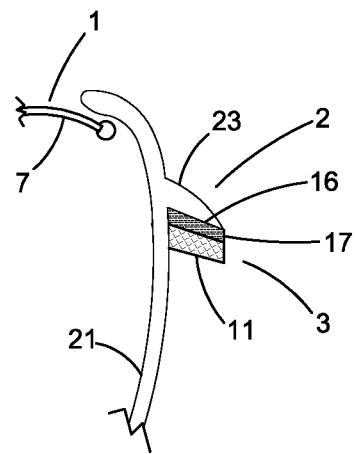
FIG. 14 is a plan view of a reflector adhesively mounted to a wing established on a worn article in one exemplary embodiment.
Figure 15:
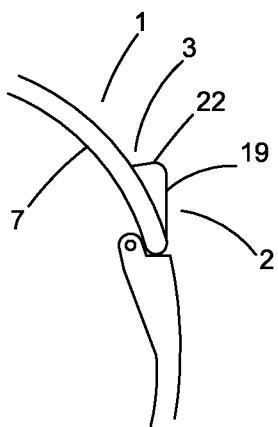
FIGS. 15 and 17 are plan views of a reflector mounted to a separate piece joined to a worn article in two exemplary embodiments.
Figure 16:
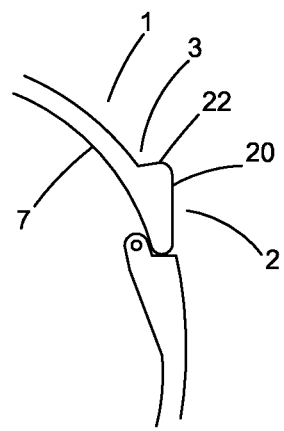
FIGS. 16 and 18 are plan views of a reflector mounted to an integrated structure joined to a worn article in two exemplary embodiments.
Figure 17:
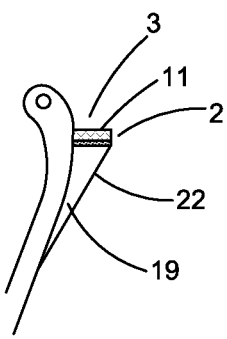
Figure 18:
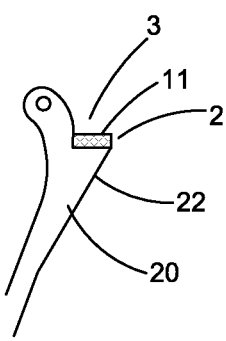
Figure 19:
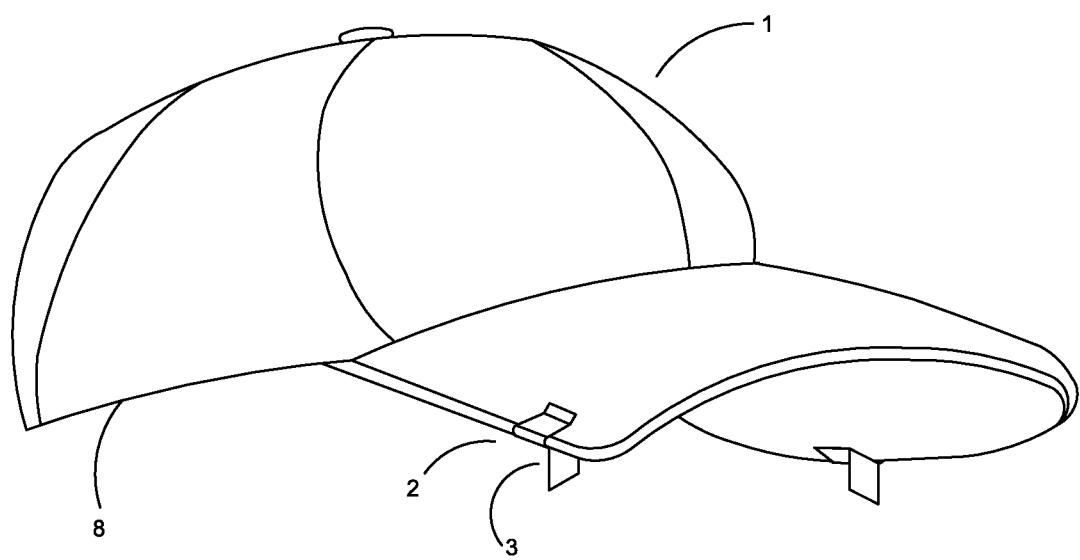
FIG. 19 is a perspective view of a reflector mounted to a mechanical fastener joined to a worn article in one exemplary embodiment.
Figure 20:
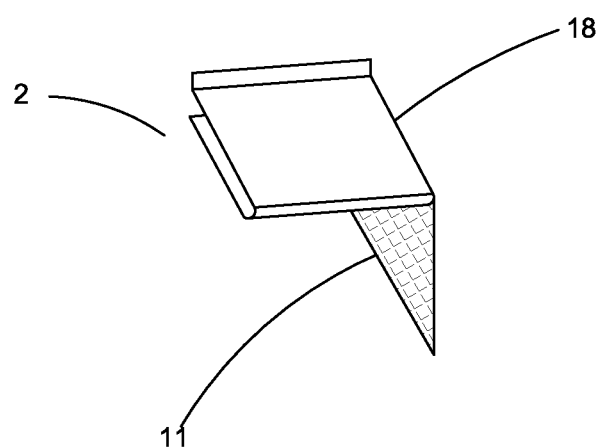
FIG. 20 is a perspective view of a reflector mounted to a mechanical fastener in one exemplary embodiment.

For illustrative purposes, FIG. 12 may show a surface coating (14) in one exemplary embodiment, FIG. 13 may show an embedded emplacement (15) in one exemplary embodiment, FIG. 14 may show an example of a molded surface (16) in one embodiment, FIG. 14 may show an example of an adhesive (17) in one exemplary embodiment, FIG. 20 may show an example of a mechanical fastener (18) in one exemplary embodiment, FIGS. 15 and 17 may show examples of separate pieces (19) in exemplary embodiments, FIGS. 16 and 18 may show examples of integrated structures (20) in exemplary embodiments, FIGS. 1 and 5-8 may show side shields (21) in exemplary embodiments, FIGS. 17-18 may show protruding surfaces (22) in exemplary embodiments, FIG. 14 may show a wing (23) in one exemplary embodiment, FIGS. 22-23 and 26-29 may show one configuration of a mounting platform (25) in one exemplary embodiment, and FIGS. 24-25 and 30-33 may show a second configuration of a mounting platform (25) in one exemplary embodiment.

Moreover, the inventive technology in various embodiments may be capable of utilization with a variety of types of safety glasses, such as the DeWalt DPG52 Contractor Pro, the DeWalt DPG54 Protector, the DeWalt DPG58 Reinforcer, the 3M Z87 Virtua, the Black & Decker BD250, and similar types of eyewear.

In some production embodiments, a mold for producing eyewear may be modified to create a mounting component (2), such as perhaps merely removing material to create a cavity or pocket, to create an embedded emplacement (15) or the like, or such as perhaps creating a raised, embossed platform (25) that is optically clear, at the outer edges of the lens, to accommodate an optical relay (3) or the like. These examples are merely illustrative, of course, and should not be construed to limit the ways in which a mold may be formed to produce the various types of mounting components (2) disclosed herein.

As mentioned, however, safety glasses (7) are just one example of an article (1). The mounting components (2) described should be considered as generally applicable to any suitable article (1), in particular including generally any cast mold, surface treatment, surface coating, embedded emplacement, molded surface, adhesive, magnet, mechanical fastener, and any combination thereof, suitable for use consistent with the inventive principles set forth herein.

Moreover, any suitable manner and modality for mounting component (2) may be selected to be complementary to any article (1) suitable for use consistent with the inventive principles set forth herein. For example, where the article (1) may be clothing, such as perhaps a safety vest, joinder of the mounting component (2) may be by sewing, stitching, or the like.

Naturally, these examples are merely illustrative of the manners and modalities which a mounting component (2) may take, and should not be construed to limit the inventive technology to just these mounting components (2) or articles (1).

As mentioned, an optical relay (3) may be mounted to the mounting component (2). FIGS. 1, 6, 9, and 12 may show examples of the conceptual functionality of an optical relay (3). The optical relay (3) may detect optical information beyond an individual's line of sight and relay that optical information to the individual's line of sight. For example, an individual might not be able to perceive objects in his or her blind spot or perhaps otherwise beyond his or her peripheral vision. In a work environment, this may include moving vehicles, such as forklifts, trucks, or the like, that are operating behind the individual's back. The optical relay (3) may make the individual aware of such vehicles in situations where the individual might not otherwise perceive them. Moreover, because the optical relay (3) is mounted to a mounting component (2) joined to an article (1) being worn by the individual, the relay will be with the individual at all times and will increase the individual's situational awareness regardless of where the individual moves to or which way he or she faces.

To relay optical information, the optical relay (3) naturally may have a blind spot optical information detector (5) and a line-of-sight optical information indicator (6). The detector may serve to detect optical information in the individual's blind spot, which may include areas out of the individual's line of sight or beyond the individual's peripheral vision, and the indicator may serve to indicate optical information to the individual.

Now with additional reference to the exemplary embodiments of FIGS. 2, 5, 7-8, and 11, in various embodiments the optical relay (3) may be an optically transformative optical relay (3). An optically transformative optical relay (3) may serve to change the appearance or nature of optical information detected, relayed, and indicated to the individual. For example, optically untransformed optical information may be simply visual information as perceived by the eye. For transformed optical information, such visual information may be changed in appearance or nature, so that it takes on a different appearance or nature to the eye.

In this manner, an optically transformative optical relay (3) may have a blind spot optically untransformed optical information detector (5) (for example, to detect optically untransformed optical information in an individual's blind spot), and a line-of-sight optically transformed optical information indicator (6) (to indicate optically transformed optical information to the individual within his or her line of sight). The optically transformative optical relay (3) may optically transform any detected optically untransformed optical information and may relay the optically transformed optical information from the individual's blind spot to the individual's line of sight.

Optical information may be transformed to assist in facilitating an individual's personal situational awareness. For example, it may be desirable to isolate relevant optical information, or to eliminate extraneous optical information. Naturally, relevant optical information might include information an individual would find relevant in having personal awareness of his or her situation, and extraneous optical information might include optical information an individual would find irrelevant, or perhaps even distracting, to having such personal situational awareness.

Work environments, such as shown conceptually perhaps in FIGS. 1, 6, 9, and 12 for exemplary embodiments, may provide one example tending to illustrate the concepts of relevant and extraneous optical information. In a work environment, relevant optical information might include information needed to assess personal safety, while extraneous optical information might include any information irrelevant or distracting to this task. Where vehicles, such as forklifts, trucks, or the like, may be moving outside of an individual's line of sight or otherwise beyond the individual's peripheral vision, an individual's safety concern may be simply knowing the presence of these vehicles, so the individual can stay clear of them. For this reason, an optical relay (3) may not need to relay all optical information of the detected background, such as stationary objects, unoccupied open spaces, or details irrelevant to the presence and movement of a vehicle. Indeed, this kind of optical information may actually distract the individual from his or her primary concern of staying aware of vehicle movements.

Rather, relevant optical information in these kinds of environments may be optical information tending to describe the presence and movement of vehicle hazards. Since vehicles in these kinds of environments frequently are equipped with warning lights (24), such as flashing beacons, blinking strobes, or the like, this may be all the relevant optical information required by the user. Accordingly, an optically transformative optical relay (3) in some embodiments may be a relevant optical information isolation relay, tending to isolate only relevant optical information for relay to an individual, and relevant optical information may be the light form a light-emitting source, such as a warning light (24) on a vehicle. Similarly, an optically transformative optical relay (3) in some embodiments may be an extraneous optical information elimination relay, tending to eliminate extraneous optical information from relay to the individual, and extraneous optical information may be non-light emitting objects, such as the environment or other background details in which vehicles may operate.

Accordingly, various embodiments may involve isolating relevant optical information, such as perhaps isolating a light-emitting source. Various embodiments also may involve eliminating extraneous optical information, such as perhaps eliminating non-light emitting objects.

Of course, the work environment example is merely illustrative of the concepts of relevant and extraneous optical information, and should not be construed to limit the scope of the inventive technology.

Referring now primarily to the exemplary embodiments of FIGS. 1, 6, 9, and 12, in some embodiments an optically transformative optical relay (3) may be a reflector, which in some embodiments may include the blind spot optically untransformed optical information detector (5) and the line-of-sight optically transformed optical information indicator (6). Reflectors may be generally known in the field of optics, and may include objects tending to throw back light propagated to the reflective surface. Reflectors therefore may be excellent (but not exclusive) objects to serve as optical relays (3), in that light propagated from an individual's blind spot to the reflective surface may be thrown back from the reflective surface to the individual's line of sight, thereby reflecting optical information from the individual's blind spot to the individual.

Any suitable object or material capable of serving as a reflector consistent with the inventive principles set forth herein may be utilized. For example, reflectors may include, and reflecting may be accomplished, with prisms, parabolic reflectors, strips, rectangles, squares, plastic, metal, reflective tape, and the like. Naturally, reflectors may be mounted to mounting components (2) as previously described. As but one example, FIGS. 1, 5-6, 8-9, and 12-18 may illustrate examples of reflectors disposed on various kinds of safety glasses (7) using various kinds of mounting components (2). However, these examples are merely illustrative, and should not be construed to limit the scope of the inventive technology.

Figure 9:
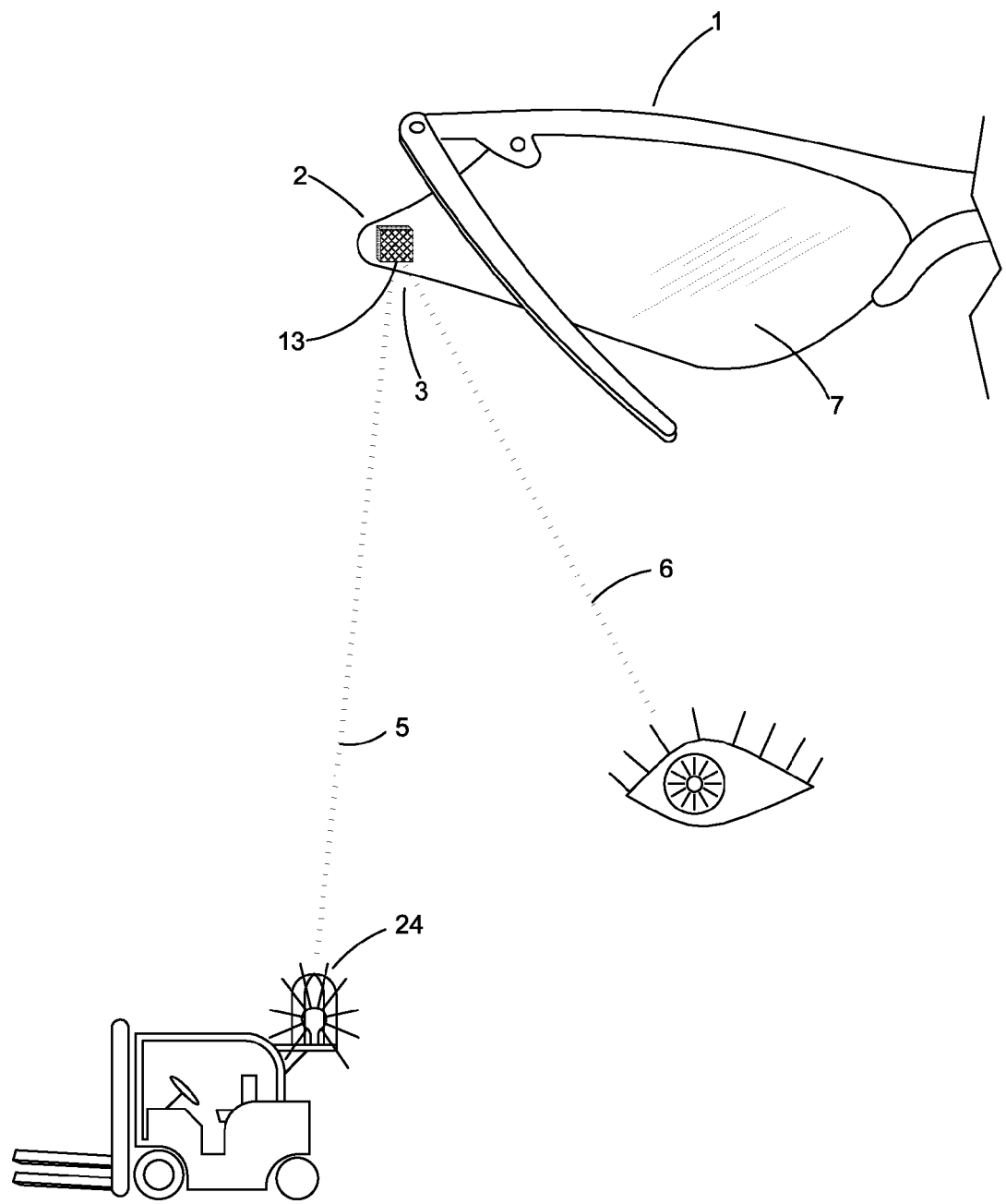
FIG. 9 is a conceptual view of the operation of a square reflector in one exemplary embodiment.
Figure 10:
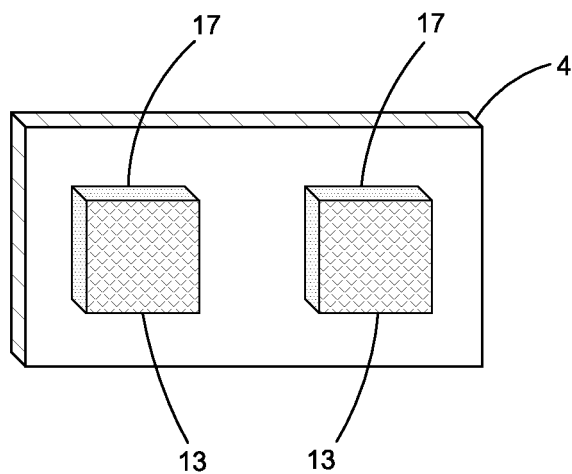
FIG. 10 is a plan view of a packaging component for a square reflector and an adhesive mounting component in one exemplary embodiment.
Figure 11:
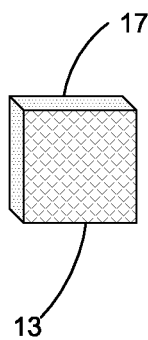
FIG. 11 is a plan view of a square reflector and an adhesive mounting in one exemplary embodiment.

For illustrative purposes, FIG. 1 may show a reflector strip (11) in one exemplary embodiment, FIGS. 5-12 may show reflector prisms (12) in exemplary embodiments, FIGS. 9 and 11 may show reflector squares (13) in exemplary embodiments, and FIG. 12 may show a reflective surface coating (14) in an exemplary embodiment.

Accordingly, in various embodiments, any or all of detecting optically untransformed optical information, optically transforming the detected optically untransformed optical information, relaying the optically transformed optical information, and indicating the optically transformed optical information may involve reflecting optical information.

In some embodiments, a reflector may be a small reflector or an inboard reflector. Small reflectors perhaps simply may be smaller than the mirrors used in conventional technologies, such as those found in U.S. Pat. No. 5,674,335, issued Oct. 7, 1997, U.S. Pat. No. 2,371,196, issued Mar. 13, 1945, and U.S. Pat. No. 1,074,145, issued Sep. 30, 1913, or perhaps simply may be sufficiently small to be comparably dimensioned to the frame of a pair of glasses (7). Inboard reflectors perhaps simply may be reflectors located in closer inward proximity to the frame of a pair of glasses (7) than the mirrors used in conventional technologies, such as those found in U.S. Pat. No. 5,674,335, issued Oct. 7, 1997, U.S. Pat. No. 2,371,196, issued Mar. 13, 1945, and U.S. Pat. No. 1,074,145, issued Sep. 30, 1913, or perhaps simply may be capable of reflecting optical information to an individual from a position at or very close to the frame of a pair of glasses (7). Examples of small inboard reflectors may be shown in FIGS. 1, 5-6, 8-9, and 12-18. Accordingly, embodiments may involve reflecting with a small inboard reflector to the frame of a pair of safety glasses (7).

Of course, the properties of a reflector may be selected to isolate relevant optical information or eliminate extraneous optical information. Examples of such properties may include the reflector's opacity or the reflector's diffusion. The opacity of a reflector may be understood within the field of optics, and may involve the degree to which the reflector transmits light. A highly opaque reflector, for example, may tend to not transmit some, perhaps even most of, the light propagated to it. Similarly, the diffusion of a reflector may be understood within the field of optics, and may involve the degree to which a reflector scatters light. A highly diffuse reflector, for example, may tend to scatter some, perhaps even most of, the light propagated to it. These properties may be utilized to develop reflectors that reflect light selectively, and this selectivity may be used to discriminate among relevant optical information and extraneous optical information.

Work environments, such as shown conceptually perhaps in FIGS. 1, 6, 9, and 12 in exemplary embodiments, again may provide an example of how the properties of a reflector may be selected to isolate relevant optical information or eliminate extraneous optical information. As previously discussed herein, relevant optical information may include light-emitting sources, such as the warning lights (24) on forklifts, trucks, or other vehicles moving through a work environment, and extraneous optical information may include non-light emitting objects.

With respect to opacity, it will be appreciated that the opacity of a reflector may be selected so that only very bright light is transmitted by the reflector. In this manner, the reflector will tend to transmit only bright light (such as warning lights (24) on vehicles, which may be relevant optical information) and not transmit dim light (which are not-light-emitting objects, or extraneous optical information). An individual utilizing such a reflector may tend to see only bright lights reflected, such as vehicle warning lights (24), and may therefore be aware of the presence of vehicles behind him.

With respect to diffusion, it will be appreciated that the diffusion of a reflector may be selected so that intense light is widely scattered by the reflector. In this manner, intense lights (such as the warning lights (24) on vehicles, which may be relevant optical information) may be scattered widely through the reflected area, perhaps tending to overpower less intense light reflected by the reflector (such as non-light-emitting objects, or extraneous optical information). An individual utilizing such a reflector may tend to see only bright lights reflected, such as vehicle warning lights (24), and may therefore be aware of the presence of vehicles behind him.

Of course, opacity and diffusion are only representative examples of how the properties of a reflector may be chosen to selectively reflect relevant or extraneous optical information. The inventive principles disclosed herein should be understood to encompass the principle of choosing any suitable property of a reflector to selectively transmit relevant or extraneous information.

In various embodiments, an optically transformative optical relay (3) may be a non-mirrored optically transformative optical relay (3). These may include optical relays (3) that do not utilize a mirror, such as to reflect, optically transform, or the like. Moreover, such non-mirrored optically transformative optical relays (3) should be appreciated to perhaps overcome the problems engendered by the use of mirrors in conventional technologies, and indeed may be considered to teach away from such conventional technologies, as discussed elsewhere herein. Accordingly, optically transforming detected optically untransformed optical information and relaying the optically transformed optical information may be accomplished without a mirror.

Embodiments also may involve using a non-representational optically transformative optical relay (3). Such an optical relay (3) may relay optical information in a form that does not represent the original form of the optical information. With respect to vehicles having warning lights (24) moving through work environments, for example, a non-representational optically transformative optical relay (3) may relay only the warning light (24), and not the other elements of the reflected scene, thereby providing optical information that is non-representational of the original optical information. Accordingly, embodiments may involve transforming detected optically untransformed optical information into non-representational optical information.

In various embodiments, an optically transformative optical relay (3) may be a fixed optically transformative optical relay (3). Such an optical relay (3) may be essentially immobile on its mounting component (2), and may not require movement to be used. For example, its position may be such as to relay optical information in situ—no movement or adjustment of position may be required to enable such relaying. Accordingly, optically transforming detected optically untransformed optical information and relaying the optically transformed optical information may be accomplished at a fixed position An optically transformative optical relay (3) in various embodiments may be an optically transformative optical relay (3) having no moving parts. Such an optical relay may not require the movement of any part in order to be used. For example, no arms may need to be extended, no surface may need to be repositioned, or the like, for the relay to be used. Accordingly, optically transforming detected optically untransformed optical information and relaying the optically transformed optical information may be accomplished without moving parts.

Figure 21:
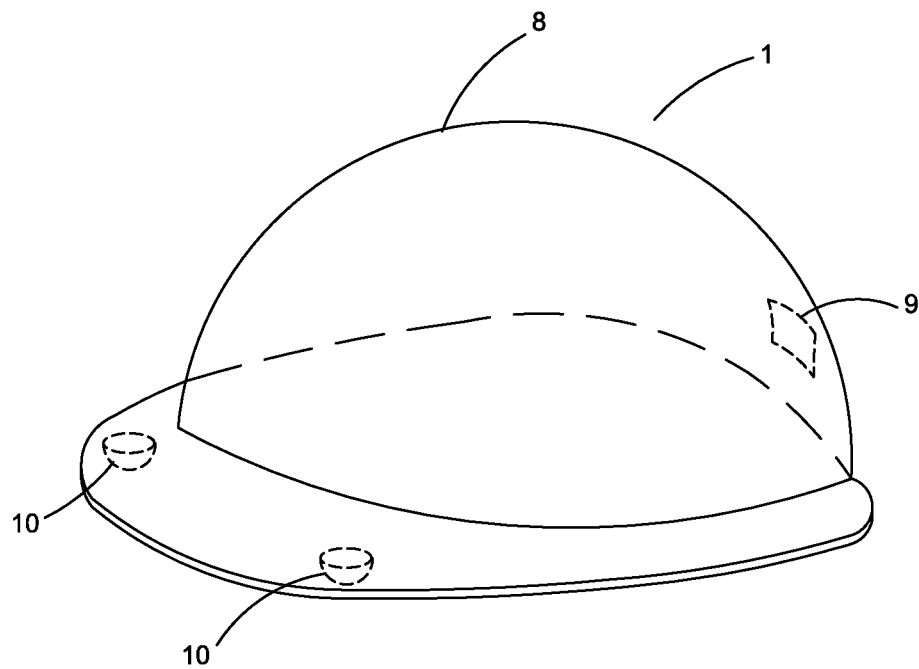
FIG. 21 is a perspective view of an electronic system mounted to mounting components joined to a worn article in one exemplary embodiment.
Figure 22:
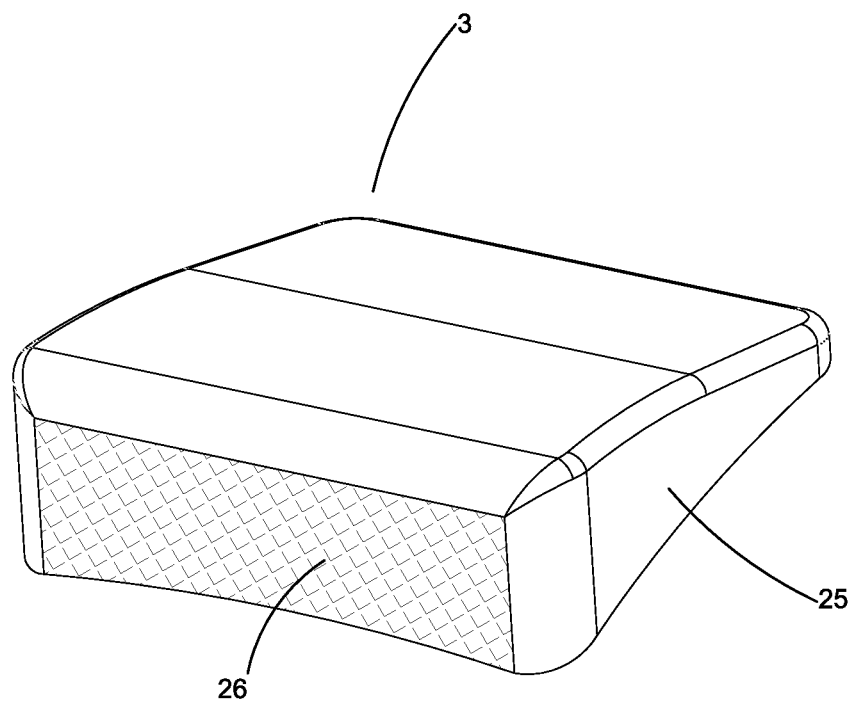
FIGS. 22-23 and 26-29 are perspective views of a first configuration of a mounting platform in one exemplary embodiment.
Figure 23:
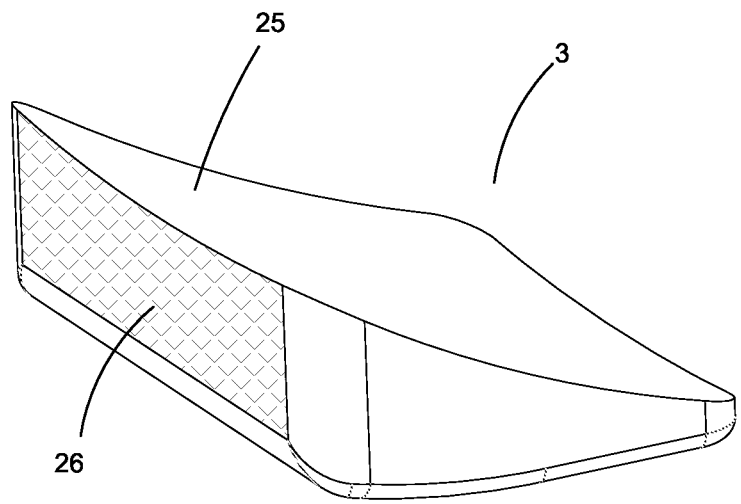
Figure 24:
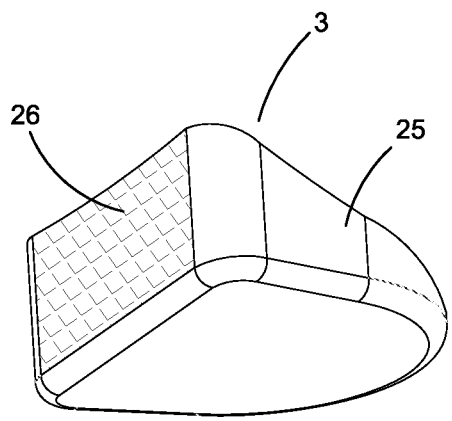
Figure 25:
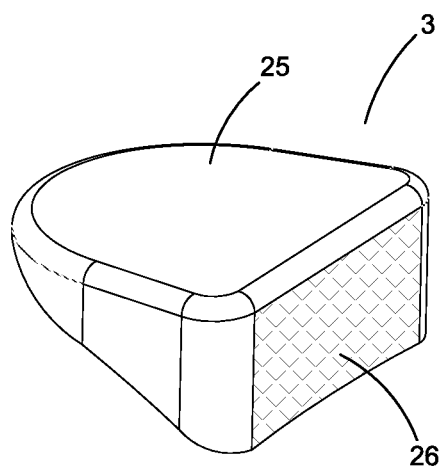
Figure 26:
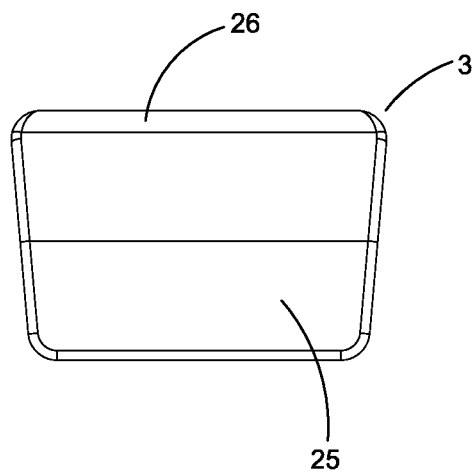
Figure 27:
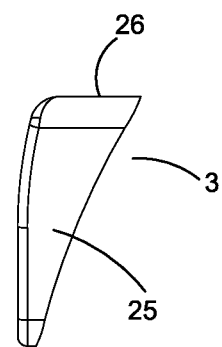
Figure 28:
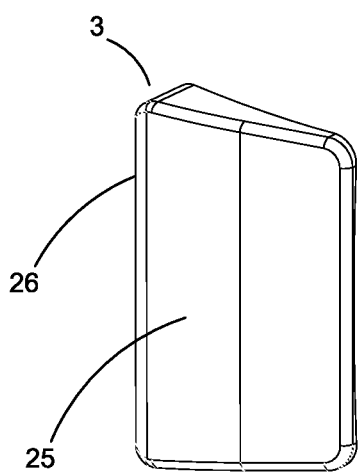
Figure 29:
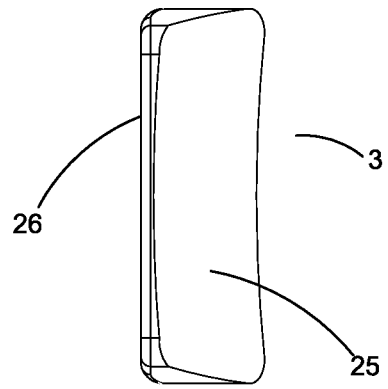

Now with reference primarily to the exemplary embodiments of FIG. 21, in some embodiments an optically transformative optical relay (3) may be an electronic optically transformative optical relay (3). Moreover, in some embodiments, an optically transformative optical relay (3), a blind spot optically untransformed optical information detector (5), and a line-of-sight optically transformed optical information indicator (6) may be an electronic system. Such an electronic system may use one or more electronic devices to do any or all of detecting optical information, relaying optical information, and indicating optical information.

Accordingly, in various embodiments, any or all of detecting optically untransformed optical information, optically transforming the detected optically untransformed optical information, relaying the optically transformed optical information, and indicating the optically transformed optical information may be accomplished electronically.

As but one example, with reference again primarily to the exemplary embodiments of FIG. 21, a hard hat or other type of safety headgear (8) may be provided with an electronic system. An electronic photosensor (9), or other suitable device for electronically detecting light or other optical information, perhaps may be positioned on the hard hat in a location amenable to detecting optical information in the individual wearer's blind spot, such as perhaps at the hard hat's rear. An electronic transmitter may be used to transmit electronic information from the electronic photosensor (9). This, of course, may be accomplished by any suitable electronic transmission, including both by wire and wirelessly. Transmitted electronic information may be electronically indicated to the individual wearer, such as perhaps by lighting an electronic lamp (10) or other suitable visual electronic indicator in the individual's line of sight. Accordingly, embodiments may include electronically photo-sensing optically untransformed optical information, electronically transmitting the optically transformed optical information, and electronically lighting an electronic lamp (10).

Of course, this example is merely illustrative and should not be construed to limit the scope of the inventive technology, including the manners and modalities an electronic system may take consistent with the inventive principles discussed herein.

A personal situational awareness system in various embodiments also may include a packaging component (4), such as to provide packaging for the system. Naturally, any suitable packaging may be utilized. In some embodiments for example, a packaging component may include adhesive and paper backing, perhaps as shown in exemplary embodiments in FIGS. 2-4 and 10-11.

As may be easily understood from the foregoing, the basic concepts of the present inventive technology may be embodied in a variety of ways. It involves both personal situational awareness techniques as well as devices to accomplish the appropriate personal situational awareness. In this application, the personal situational awareness techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this patent application is intended to serve as a basic description. The reader should be aware that the specific discussion may not explicitly describe all embodiments possible; many alternatives are implicit. It also may not fully explain the generic nature of the inventive technology and may not explicitly show how each feature or element can actually be representative of a broader function or of a great variety of alternative or equivalent elements. Again, these are implicitly included in this disclosure. Where the inventive technology is described in device-oriented terminology, each element of the device implicitly performs a function. Apparatus claims may not only be included for the device described, but also method or process claims may be included to address the functions the inventive technology and each element performs. Neither the description nor the terminology is intended to limit the scope of the claims that will be included in any subsequent patent application.

It should also be understood that a variety of changes may be made without departing from the essence of the inventive technology. Such changes are also implicitly included in the description. They still fall within the scope of this inventive technology. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the inventive technology both independently and as an overall system.

Further, each of the various elements of the inventive technology and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the inventive technology, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this inventive technology is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "reflector" should be understood to encompass disclosure of the act of "reflecting"—whether explicitly discussed or not—and, conversely, were there effectively disclosure of the act of "reflecting", such a disclosure should be understood to encompass disclosure of a "reflector" and even a "means for reflecting." Such changes and alternative terms are to be understood to be explicitly included in the description.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference.

Finally, all references listed in the list of References To Be Incorporated By Reference In Accordance With The Patent Application or other information statement filed with the application are hereby appended and hereby incorporated by reference, however, as to each of the above, to the extent that such information or statements incorporated by reference might be considered inconsistent with the patenting of this/these inventive technology(s) such statements are expressly not to be considered as made by the applicant(s).

Thus, the applicant(s) should be understood to have support to claim and make a statement of invention to at least: i) each of the personal situational awareness devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC*, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 25 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the inventive technology, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A personal situational awareness apparatus comprising:
   a mounting component configured for joinder to an article configured to be worn on an individual's person;
   an optically transformative optical relay mounted to said mounting component,
   a line-of-sight optically transformed optical information indicator of said optically transformative optical relay;
   a blind spot optically untransformed optical information detector of said optically transformative optical relay.

2. A personal situational awareness apparatus as described in claim 1, wherein said article comprises safety glasses.

3. A personal situational awareness apparatus as described in claim 2, wherein said mounting component comprises a mounting component selected from the group consisting of a cast mold for said safety glasses, surface treatment on said safety glasses, a surface coating on said safety glasses, an embedded emplacement within said safety glasses, a molded surface of said safety glasses, an adhesive adhered to said safety glasses, a magnet attached to said safety glasses, a mechanical fastener affixed to said safety glasses, a separate piece joined to said safety glasses, an integrated structure of said safety glasses, a side shield of said safety glasses, a protruding surface of said safety glasses, a wing established on said safety glasses, a mounting platform joined to said safety glasses, and any combination thereof.

4. A personal situational awareness apparatus as described in claim 3, wherein said optically transformative optical relay comprises a reflector.

5. A personal situational awareness apparatus as described in claim 4, wherein said reflector comprises a reflector selected from the group consisting of a prism, a parabolic reflector, a strip, a rectangle, a square, a high-opacity reflector, a high-diffusion reflector, a plastic reflector, a metal reflector, reflective tape, and any combination thereof.

6. A personal situational awareness apparatus as described in claim 4, wherein said reflector comprises a small inboard reflector to the frame of said safety glasses.

7. A personal situational awareness apparatus as described in claim 1, wherein said article comprises safety headgear.

8. A personal situational awareness apparatus as described in claim 7, wherein said blind spot optically untransformed optical information detector comprises an electronic photosensor, and wherein said optically transformative optical relay comprises an electronic transmitter, and wherein said optically transformed optical information indicator comprises an electronic lamp.

9. A personal situational awareness apparatus as described in claim 1, wherein said optically transformative optical relay, said line-of-sight optically transformed optical information indicator, and said blind spot optically untransformed optical information detector comprise a reflector.

10. A personal situational awareness apparatus as described in claim 9, wherein said reflector comprises a high-opacity reflector.

11. A personal situational awareness apparatus as described in claim 9, wherein said reflector comprises a high-diffusion reflector.

12. A personal situational awareness apparatus as described in claim 9, wherein said reflector comprises a reflector selected from the group consisting of a prism, a parabolic reflector, a strip, a rectangle, a square, a plastic reflector, a metal reflector, reflective tape, and any combination thereof.

13. A personal situational awareness apparatus as described in claim 1, wherein said optically transformative optical relay, said line-of-sight optically transformed optical information indicator, and said blind spot optically untransformed optical information detector comprise an electronic system.

14. A personal situational awareness apparatus as described in claim 13, wherein said blind spot optically untransformed optical information detector comprises an electronic photosensor, and wherein said optically transformative optical relay comprises an electronic transmitter, and wherein said optically transformed optical information indicator comprises an electronic lamp.

15. A personal situational awareness apparatus as described in claim 1, wherein said mounting component comprises a component selected from the group consisting of a cast mold, surface treatment, a surface coating, an embedded emplacement, a molded surface, an adhesive, a magnet, a mechanical fastener, a mounting platform, and any combination thereof.

16. A personal situational awareness apparatus as described in claim 1, wherein said optically transformative optical relay comprises a fixed optically transformative optical relay.

17. A personal situational awareness apparatus as described in claim 1, wherein said optically transformative optical relay comprises an optically transformative optical relay having no moving parts.

18. A personal situational awareness apparatus as described in claim 1, wherein said optically transformative optical relay comprises a non-mirrored optically transformative optical relay.

19. A personal situational awareness apparatus as described in claim 1, wherein said optically transformative optical relay comprises a non-representational optically transformative optical relay.

20. A personal situational awareness apparatus as described in claim 1, wherein said optically transformative optical relay comprises a relevant optical information isolation relay.

21. A personal situational awareness apparatus as described in claim 20, wherein said relevant optical information comprises a light-emitting source.

22. A personal situational awareness apparatus as described in claim 1, wherein said optically transformative optical relay comprises an extraneous optical information elimination relay.

23. A personal situational awareness apparatus as described in claim 22, wherein said extraneous optical information comprises non-light-emitting objects.

* * * * *